(12) United States Patent
Zhou et al.

(10) Patent No.: US 11,241,022 B2
(45) Date of Patent: Feb. 8, 2022

(54) SHORT TEXTURE CARAMEL

(71) Applicant: ROQUETTE FRERES, Lestrem (FR)

(72) Inventors: Liuming Zhou, Geneva, IL (US); Tom Parady, Batavia, IL (US); Leslie Kleiner, North Aurora, IL (US)

(73) Assignee: ROQUETTE FRERES, Lestrem (FR)

( * ) Notice: Subject to any disclaimer, the term of this patent is extended or adjusted under 35 U.S.C. 154(b) by 120 days.

(21) Appl. No.: 16/314,265

(22) PCT Filed: Jul. 11, 2017

(86) PCT No.: PCT/EP2017/067414
§ 371 (c)(1),
(2) Date: Dec. 28, 2018

(87) PCT Pub. No.: WO2018/011213
PCT Pub. Date: Jan. 18, 2018

(65) Prior Publication Data
US 2019/0200639 A1 Jul. 4, 2019

(30) Foreign Application Priority Data
Jul. 13, 2016 (EP) .................................... 16305901

(51) Int. Cl.
*A23G 3/42* (2006.01)
*A23G 3/32* (2006.01)

(52) U.S. Cl.
CPC ................. *A23G 3/42* (2013.01); *A23G 3/32* (2013.01); *A23V 2002/00* (2013.01)

(58) Field of Classification Search
CPC ................................... A23G 3/42; A23G 3/32
USPC ......................................................... 426/660
See application file for complete search history.

(56) References Cited

U.S. PATENT DOCUMENTS

| 3,800,045 A | 3/1974 | Brucker et al. |
| 4,710,393 A * | 12/1987 | Holmgren ................ A23G 3/36 426/321 |
| 2002/0192344 A1 | 12/2002 | Brendel et al. |
| 2002/0197357 A1 | 12/2002 | Pfeiffer |
| 2010/0278977 A1 | 11/2010 | Ervin |
| 2013/0236604 A1 | 9/2013 | De Baets |

FOREIGN PATENT DOCUMENTS

EP  0 515 864 A1  12/1992

OTHER PUBLICATIONS

Aug. 2, 2017 Search Report issued in International Patent Application No. PCT/EP2017/067414, pp. 1-4.
Mendenhall et al., "Control of Caramel Texture through Formulation," The Manafacturing Confectioner, pp. 57-67, Jan. 2014.

\* cited by examiner

*Primary Examiner* — Jyoti Chawla
(74) *Attorney, Agent, or Firm* — Oliff PLC

(57) ABSTRACT

The present invention relates to short texture caramel containing bimodal carbohydrates ingredients that combine high molecular weight polysaccharides and at least one monosaccharide.

4 Claims, No Drawings

SHORT TEXTURE CARAMEL

FIELD OF THE INVENTION

The present invention relates to a short texture caramel and the process of preparation of such short texture caramel candy.

STATE OF THE ART

Chewy confectioneries are popular food items. The most familiar varieties are caramels, kisses, jelly candies, taffy and toffee and fudge.

Caramel is by definition a smooth chewy candy made with sugar (sucrose or glucose syrup), butter, cream or milk.

Caramel is often eaten as little brown, sweet, buttery nuggets wrapped in cellophane, but it may be also incorporated in candy bars and on top of fresh popcorn.

The best caramels are sweet and just a bit chewy. Caramel/toffee would be smooth and silky while fudge can be very short and sandy.

Caramels can, in fact, have a variety of textures. Caramel manufacturers use the term "short" to characterize a caramel that is soft, of low stringiness and "long" for a caramel that is quite chewy, of high stringiness.

Technologically, these specialties are classified according to their moisture content residual and of their texture.

The hard caramels have a residual moisture from 2 (like Werthers) to 7% (like Carambar) and one hard and smooth texture, whereas the soft caramels have a relative humidity relative from 7 to 12% and a tender texture and masticable.

Name "caramels (short or hard)", accompanied or not by a qualifier, are reserved for confectioneries prepared by cooking of sugar, of glucose (or invert sugar), of food fat content (butyric grease, vegetable fat and/or animal grease) and of dairy proteins, the fat content and the dairy proteins having to be in proportion such as the end product comprises at least 6% of fat on dry matter and 6% coming from milk on dry matter.

While hard candies are plastic or malleable at high temperature, but glass-like (clear and easily cracked) when cooled, caramels are plastic at both high temperature and room temperature.

Caramels are softer because they have been cooked to a lower temperature than hard candies (to approximately 118° C., or the firm ball stage) and contain more moisture.

Because of this soft texture, caramel may be extruded at lower temperatures or under very low pressure), inserted into a mold, and put into a variety of other candies or candy bars to add flavor, binding, and texture.

The raw materials used for its preparation vary with the manufacturer and type of caramel under production.

The ingredients include milk, sometimes sweetened condensed milk, corn syrup, sugar, oil, whey, calcium carbonate, salt, flavor, butter or another type of fat such as vegetable oil, molasses, and corn starch.

Milk is essential to distinguish the caramel from a hard candy, and it is the milk solids that change chemically to produce the caramel.

Corn syrup lends additional sweetness to the candy batch but also keeps the mixture from becoming grainy, which would indicate there is too much sugar in the batch (graininess will ruin a batch of caramels). Corn syrup also lends body to the slurry. At least one fat is added to the mixture as well.

Butter is often the only fat added by gourmet caramel-makers as it provides superior taste, but this proves to be very expensive for mass-production.

So other fats are added along with a fairly small amount of butter. As maple caramels or other flavored caramels are produced, the ingredients vary accordingly.

The composition of caramels can also vary on the whole according to the intensity of color and taste as well as required texture.

One of the problems associated with producing chewy confectionaries, such as caramel, is the need to achieve the appropriate relatively short texture.

Prior art processes do this by:
inhibiting sugar crystallization. Indeed, with the need to maintain the high quality mouthfeel and taste desired by the consumer, the grained caramel is disadvantageous. In addition, the graining from the presence of insoluble crystals only occurs after cooling. Therefore, this provides no advantage for facile depositing;
adding fat. However, with the growing concern for the number of overweight and obese individuals and the associated health problems, it is advantageous to limit the amount of fat added to foods. Therefore, in the case of the caramel with additional fat, the disadvantage is the high fat and high caloric content.

So it remains a need to propose new solution that allows an improvement over standard short textured caramels without the inclusion of additional fat and retaining the high quality mouthfeel and taste.

Because of their taste and functional properties, the sugar like sucrose, invert sugar, glucose syrup and the like, were largely used for the preparation of caramel.

However, it is known that excess intake of these nutritive sweeteners has long been associated with diet-related health issues, such as obesity, heart disease, metabolic disorders and dental problems.

Accordingly, consumers are increasingly looking for ways to decrease the amount of nutritive sweeteners in their diets.

So, there is a need for seeking to develop replacements for nutritive sweeteners that are better able to mimic the desirable taste and functional properties of the nutritive sweeteners, but which also has low or no calories.

The lower glycemic index of polyols (also named sugar alcohols), as compared to sugars such as sucrose and glucose, makes them suitable in the management of diabetes or in weight management.

Furthermore, the well-established dental benefits of using polyols, such as maltitol, xylitol, instead of conventional sweeteners, such as sucrose (e.g., dramatic reductions in new tooth decay, arrest and, in some instances, reversal of existing dental decay) make polyols desirable for use as alternative sweeteners.

It is for this reason that confectionery manufacturers have been led to develop sugar-free combinations in which polyols are rightly used because of their harmlessness towards the teeth and of their reduced calorific value compared with sucrose.

One of the great difficulties from which formulators of sugar-free confectionery products cannot escape is that of successfully manufacturing products which are in every respect similar to traditional products to the extent that it is difficult to tell them apart, this being without having to substantially alter or complicate the plants and the procedures in place in industries.

This is also true of the confectionery products, i.e. caramel, which are the subject of the present invention.

Another difficulty is that literature on polyols demonstrates that, despite their many advantages, they may result in unpleasant side effects which include lower abdominal pain, bloating or even acute, non-infectious, non-inflammatory diarrhea. For this reason, some people, especially those with intestinal sensitivity, avoid candies containing polyols.

This was justified for reasons of a technical nature linked to ease of manufacture but also of an economic and metabolic nature, that is to say in particular of digestive tolerance.

Furthermore, it was particularly advantageous to limit as much as possible the incorporation of polyols which indeed contain fewer calories than sugar, but contain more calories than other bulking agents which may also enter into the formulation of such confectionery products, such that, if desired, a substantially higher calorie reduction can thus be obtained.

It was therefore found by the assignee that the combination of polysaccharides such as branched maltodextrins and certain polyols made it possible to prepare sugar-free confectionery products which are very well tolerated, optionally having a low calorific value, an excellent stability and an adaptable texture, at a rate of use, expressed relative to the sweetening mass present in confectionery products.

In view of the above, it would be desirable to provide a low or zero calorie sweetener that is able to replace nutritive sweeteners directly, without the need for other components.

The concept is about "good for teeth", none polyol short texture chew.

Such sweetener should be able to be used in high amounts to provide the bulk, sweetening and functional properties of the nutritive sweeteners being replaced.

It has now been found that D-psicose (also called D-allulose) can be used in food and beverage products at high levels to provide the required bulk, sweetening and functional properties.

D-allulose, also called D-psicose, has 70% of the relative sweetness of sucrose but a caloric value of only 0.2 Kcal/g.

It is a C-3 epimer of D-fructose, which belongs to "rare sugars". D-allulose can be produced from D-fructose by D-tagatose 3-epimerase (DTEase) family enzymes which have been found in various micro-organisms.

Moreover, D-allulose has been found to have a positive effect on the reduction of the glycemic response induced by the ingestion of maltose and sucrose (Matsuo T. et al., *J. Jpn. Soc. Nutr. Food Sci.* 2006; 59: 119-121).

SUMMARY OF THE INVENTION

The present invention relates to a short texture caramel with bimodal carbohydrates ingredients that combine high molecular weight polysaccharides having less than 20% DP2 and DP3 (disaccharides+trisaccharides) and a molecular weight (MW) ranging from 2500 to 6000 Da and at least one monosaccharide ranging from 30% to 70% (expressed on dryness) of the total carbohydrate composition.

The monosaccharides are chosen in the group consisting of D-psicose, fructose, glucose, tagatose, xylose, mannose, arabinose, sorbose and ribose, and are more particularly D-psicose or fructose.

The high molecular weight polysaccharides are chosen in the group consisting of maltodextrins, branched maltodextrins, indigestible dextrin, maltooligosaccharides and resistant dextrin, and are more particularly branched maltodextrins.

The present invention relates also to the process of preparation of such short texture caramel candy.

DETAILED DESCRIPTION OF THE INVENTION

By "short texture caramel" is intended to refer to a caramel that is soft and of low stringiness.

By "caramel" is intended to refer to confectioneries prepared by cooking of sugar, of glucose (or invert sugar), of food fat content (butyric grease, vegetable fat and/or animal grease) and of dairy proteins.

Currently, to make a caramel with a short texture that machines and deposits easily requires either the inclusion of additional fat or the presence of insoluble crystals (i.e. crystallized caramel).

With the growing concern for the number of overweight and obese individuals and the associated health problems, it is advantageous to limit the amount of fat added to foods.

Therefore, in the case of the caramel with additional fat, the disadvantage is the high fat and high caloric content.

With the need to maintain the high quality mouthfeel and taste desired by the consumer, the grained caramel is disadvantageous.

In addition, the graining (=uncontrolled spontaneous crystallization or uncontrolled crystallization continuing) from the presence of insoluble crystals only occurs after cooling. Therefore, this provides no advantage for facile depositing.

This invention is an improvement over standard short textured caramels in that the inclusion of additional fat is not required and the high quality mouthfeel and taste are retained.

The solution proposed by the present invention is so to combine a particular DP1 sugar or a mixture of particular DP1 sugars with a relatively higher molecular weight MW carbohydrate (i.e. ranging from 2500 to 6000 Da) to create a short texture without the inclusion of additional fat or the insoluble crystals.

The present invention relates to a short texture caramel comprising at least one monosaccharide and high molecular weight polysaccharides.

The at least one monosaccharide is preferably selected in the group consisting of D-psicose, fructose, glucose, tagatose, xylose, mannose, arabinose, sorbose, ribose and a combination thereof. Preferably, the at least one monosaccharide is more particularly D-psicose or fructose.

Preferably, the monosaccharide is in a range from 30% to 70% in weight (expressed on dryness) of the total carbohydrate composition, preferably from 40% to 60%, still more preferably from 45% to 55%.

Preferably, the short texture caramel comprises less than 30% of DP2 and DP3 disaccharides, more preferably less than 25, 20, 15, 10, 5, 4, 3, 2 or 1% of DP2 in dry weight of the total carbohydrate composition.

Preferably, the high molecular weight polysaccharides have a molecular weight (MW) ranging from 2500 to 6000 Da.

Preferably, they comprise less than 20%, 15%, 10% or 5% in weight of DP2 and DP3 (disaccharides+trisaccharides).

The high molecular weight polysaccharides can be chosen in the group consisting of maltodextrins, branched maltodextrins, indigestible dextrin, maltooligosaccharides resistant dextrin and a combination thereof, and are more particularly branched maltodextrins.

For instance, the high molecular weight polysaccharides can be a maltodextrin having a DE comprised in the range of 12 and 19.

Alternatively, the high molecular weight polysaccharides can be a branched maltodextrin.

In one embodiment, the short texture caramel comprises one, several or all the following features:

a residual moisture of 7 to 12%;
a fat content of 1 to 15% in weight;
a lactose content of 1 to 6% in weight;
a content of dairy protein of 0.75 to 15% in weight;
a carbohydrate content of 30 to 60% in weight.

To study the effect on the texture of caramels, of:

DP1 sweeteners, it was chosen D-psicose or fructose, and
high molecular weight polysaccharide, it was chosen a soluble fiber (branched maltodextrins).

The expression "branched maltodextrins" is understood to mean, for the purposes of the present invention, the maltodextrins described in the document EP-A-1,006,128 and in its US counterpart (U.S. Ser. No. 09/455,009), of which the assignee is proprietor.

The entire content of U.S. Ser. No. 09/455,009 is herein incorporated by reference.

These branched maltodextrins have an indigestibility character which has the consequence of reducing their calorific value, by preventing their assimilation in the small intestine.

Their low content of molecules having a low degree of polymerization ("DP") also contributes to their low calorific value.

Their high content of 1→6 glucoside linkages has the consequence of reducing their cariogenic power by reducing their assimilation by the microorganisms of the buccal cavity.

This high level of 1→6 linkages also confers quite special prebiotic properties on them: it has indeed appeared that the bacteria of the caecum and of the colon in humans and animals, such as butyrogenic, lactic or propionic bacteria, metabolize highly branched compounds.

Moreover, these branched maltodextrins promote the development of bifidogenic bacteria to the detriment of undesirable bacteria. This results in properties which are quite beneficial to the health of the consumer.

As controls, it was chosen to analyze the texture of caramel that:

combine D-psicose or fructose with standard maltodextrin.
combine sucrose (DP2) and standard maltodextrin;

As maltodextrin, it was chosen two products commercialized by ROQUETTE FRERES under the named GLUCIDEX® 12 and GLUCIDEX® 19.

As fructose, it was chosen fructose syrup like:

High Fructose Corn Syrup 42 (HFCS-mixture of DP1 and DP2: ~94% (42.5% fructose and 51.5% dextrose)+3% DP2), or
High Fructose Corn Syrup 55 (HFCS). The composition of HFCS-55 was ~95% DP1 fructose and dextrose.

This invention will be better understood in light of the following example which are given for illustrative purposes only and do not intend to limit the scope of the invention, which is defined by the attached claims.

EXAMPLES

Methods:

Stringiness is measured by scooping caramel with a 5 mL spoon and measuring the lengths of the string formed before the breaking point.

The measurements were given as a number on a scale ranging from 0 to 9.

The control, which was neither short nor long, was given a number 6.

Long texture caramels were classified as higher than 6 (between 7 and 9), while short texture caramels were classified as much lower than 6, (preferably between 1 and 3).

Stickiness was determined by puncturing the sample with a glass rod and assigning a stickiness value using a 0-9 scale.

Water activity was measured with an Aqua LAB 4TE Decagon Services meter.

Example 1. Texture of Caramels Comprised of DP1 and/or DP2 Sugars and High Molecular Weight Bulking Agents The general formulation used for the experiments is given by the table 1.

As high molecular weight polysaccharide, it was chosen the branched maltodextrin commercialized by ROQUETTE FRERES under the name NUTRIOSE® FM 06.

TABLE 1

Formulation for DP1, DP2, and DP1 + DP2 studies with NUTRIOSE ® FM 06

| Ingredient | (%) w/w |
| --- | --- |
| Heavy Cream | 27 |
| NUTRIOSE ® FM06 | 26.8 |
| HFCS 42/or Sucrose/or Dextrose | 23.75 |
| Evaporated Milk (w/fat) | 8 |
| Water | 7.5 |
| Butter | 5.6 |
| Lecithin | 0.2 |
| Salt | 0.1 |
| Vanilla (2x) | 1 |
| Sodium Bicarbonate | 0.05 |

HFCS 42 is corn syrup which contains 42% of fructose.

The results obtained are given by the table 2.

TABLE 2

Water activity, stringiness and stickiness scale

| Formulation # | Sweetener, Fiber | Aw @ 25° C. | Stringiness Scale | Stickiness Scale |
| --- | --- | --- | --- | --- |
| C1-Control | Corn syrup solids, sucrose, dextrose, without high molecular weight polysaccharide | 0.59 | 6 | 6 |
| C2 | HFCS 42 (DP1 + DP2) + NUTRIOSE ® FM 06 | 0.61 | 2 | 3 |
| C3 | Sucrose (DP2) + NUTRIOSE ® FM 06 | 0.63 | 5 | 8 |
| C4 | Dextrose (DP1) + NUTRIOSE ® FM 06 | 0.61 | 2 | 5 |
| C5 | HFCS 42 (DP1 + DP2) + GLUCIDEX ® 12 | 0.65 | 1 | 8 |
| C6 | HFCS 42 (DP1 + DP2) + GLUCIDEX ® 19 | 0.62 | 2 | 6 |

Conclusions:

Caramels containing DP1 sweetener and NUTRIOSE® FM 06, such as those comprised by HFCS 42 and NUTRI- OSE® FM 06 (C2), and dextrose and NUTRIOSE® FM 06 (C4) have low stringiness and stickiness when compared to a caramel control (C1), and similar composition containing sucrose (DP2) and NUTRIOSE FM 06 (C3).

Caramels containing DP1 Sweetener (HFCS 42) and GLUCIDEX® 12 (C5) or GLUCIDEX® 19 (C6) had lower stringiness than control, and similar stringiness than DP1 sweeteners with NUTRIOSE FM 06 (C4). However, the stickiness of the formulations containing GLUCIDEX® and DP1 was equal or higher than control.

Therefore, DP1 plus NUTRIOSE® FM 06 is preferred for stickiness and stringiness over DP1 and GLUCIDEX® formulations.

Example 2. Texture of Allulose or Fructose Caramels and Higher Molecular Weight Bulking Agents Various caramel compositions containing DP1 sugars and soluble corn fiber NUTRIOSE® FM® 06 were studied. Besides fiber, the main ingredients used were allulose (DP1), and High Fructose Corn Syrup 55 (HFCS). The composition of HFCS-55 was ~95% DP1 fructose and dextrose.

Table 3 shows the composition of four different formulations for caramel. One formulation is HFCS-55 based and has no fiber.

This formulation was also performed replacing HFCS-55 by allulose syrup 5.

Both of these formulations yielded caramels of long texture (stringiness ranging between 7 and 9 in the stringiness scale).

The remaining formulations had either HFCS 55 or allulose in combination with NUTRIOSE® FM 06. These caramels had short texture (stringiness ranging between 1 and 3).

TABLE 3

Caramel formulations using HFCS-55, allulose, and/or NUTRIOSE ® FM 06 at constant fat content
Ingredient Percentage[a] (%) in Formulation

| Caramel Formulation | HFCS-55 | Allulose Syrup | HFCS-55 + FM06 | Allulose + FM06[c] |
|---|---|---|---|---|
| Heavy Cream | 27.00 | 27.00 | 27.00 | 27.00 |
| Evaporated Milk (w/fat) | 8.00 | 8.00 | 8.00 | 8.00 |
| HFCS-55 | 53.60 | — | 25.20 | — |
| Allulose Syrup | — | 52.00 | — | 24.40 |
| NUTRIOSE ® FM06 | — | — | 23.10 | 23.10 |
| Butter | 5.60 | 5.60 | 5.60 | 5.60 |
| Salt | 0.10 | 0.10 | 0.10 | 0.10 |
| Water | 4.50 | 6.10 | 9.75 | 10.55 |
| Lecithin | 0.20 | 0.20 | 0.20 | 0.20 |
| Sodium Bicarbonate | — | — | 0.05 | 0.05 |
| Vanilla (2x) | 1.00 | 1.00 | 1.00 | 1.00 |
| Total | 100.00 | 100.00 | 100.00 | 100.00 |
| Nutritional Data[b] per 30 g serving size: | | | | |
| Calories (kcal) | 136.10 | 99.90 | 117.90 | 100.90 |
| Total Carbohydrates (g) | 17.33 | 18.82 | 18.10 | 18.80 |
| Sugar alcohols (g) | 0.00 | 0.00 | 0.00 | 0.00 |
| Sugars (g) | 16.54 | 18.51 | 8.03 | 8.94 |
| Fiber (g) | 0.00 | 0.00 | 8.13 | 8.13 |
| Protein (g) | 0.50 | 0.50 | 0.50 | 0.50 |
| Total Fat (g) | 6.68 | 6.68 | 6.68 | 6.69 |
| Texture[c] | long (7-9) | long (7-9) | Non-grained, Short (1-3) | Non-grained, short (1-3) |

[a]Commercial basis
[b]Nutritional content calculated from ingredient specifications and/or from the USDA's National Nutrient Database for Standard Reference Release 27, when specifications were not available
[c]Same capital letter in the same row indicates textures that were found not to be different from each other Conclusions:

At constant fat content, DP1 Sweetener (allulose or HFCS-55) yields short texture caramel in the presence of NUTRIOSE® FM 06.

The opposite (long texture) is achieved if NUTRIOSE® FM 06 is removed from the formulation.

The invention claimed is:

1. Short texture caramel, comprising:
   a total carbohydrate composition comprised of high molecular weight polysaccharides having a molecular weight (MW) ranging from 2500 to 6000 Da and at least one monosaccharide,
   wherein the high molecular weight polysaccharides are branched maltodextrins, and
   wherein the at least one monosaccharide is chosen from the group consisting of D-psicose and fructose, and excludes dextrose.

2. Short texture caramel of claim 1, wherein the high molecular weight polysaccharides have less than 20% in weight of DP2 and DP3 (disaccharides+trisaccharides).

3. Short texture caramel of claim 1, wherein the monosaccharide is in a range from 30% to 70% in weight (expressed on dryness) of the total carbohydrate composition.

4. Short texture caramel of claim 2, wherein the monosaccharide is in a range from 30% to 70% in weight (expressed on dryness) of the total carbohydrate composition.

* * * * *